United States Patent [19]

Shiraishi et al.

[11] 4,242,375

[45] Dec. 30, 1980

[54] PROCESS FOR PRODUCING OPTICAL TRANSMISSION FIBER

[75] Inventors: Satoshi Shiraishi; Kunio Fujiwara; Shiro Kurosaki, all of Osaka, Japan

[73] Assignee: Sumitomo Electric Industries, Ltd., Osaka, Japan

[21] Appl. No.: 930,841

[22] Filed: Aug. 3, 1978

Related U.S. Application Data

[60] Division of Ser. No. 648,997, Jan. 14, 1976, Pat. No. 4,161,505, which is a division of Ser. No. 419,011, Nov. 26, 1973, abandoned, Ser. No. 648,998, Jan. 14, 1976, which is a continuation of Ser. No. 419,011, , and Ser. No. 826,572, Aug. 22, 1977, Pat. No. 4,165,152, which is a division of Ser. No. 648,998, , Pat. No. 4,082,420.

[30] Foreign Application Priority Data

Nov. 25, 1972 [JP] Japan ................................ 47/118345
Nov. 25, 1972 [JP] Japan ................................ 47/118346

[51] Int. Cl.$^3$ ................................................ B05D 5/06
[52] U.S. Cl. ............................................ 427/163; 65/3 A; 427/171; 427/231; 427/237; 427/376.2

[58] Field of Search ............... 427/163, 171, 231, 237, 427/376 A; 65/3 A

[56] References Cited

U.S. PATENT DOCUMENTS 3,778,132 12/1973 Pinnow et al. ..................... 65/4 B

*Primary Examiner*—Bernard D. Pianalto
*Attorney, Agent, or Firm*—Sughrue, Rothwell, Mion, Zinn and Macpeak

[57] ABSTRACT

A process for producing an optical transmission fiber is provided which comprises feeding highly pure halides, hydrides or organic compounds of Si and B by way of carrier gas on the outer surface of a fused silica rod or a fused silica pipe, or inner surface of a fused silica pipe, oxidizing them and depositing the products to form a pure fused silica layer or a doped fused silica layer containing $B_2O_3$, melting the pipe and the deposited layer followed by a spinning. The $SiO_2$ layer can alternatively contain fluorine instead of $B_2O_3$. A further $SiO_2$ layer can be deposited thereon to improve the spinning processability and lower the index of refraction of the $B_2O_3$ containing layer.

32 Claims, 4 Drawing Figures

F     G

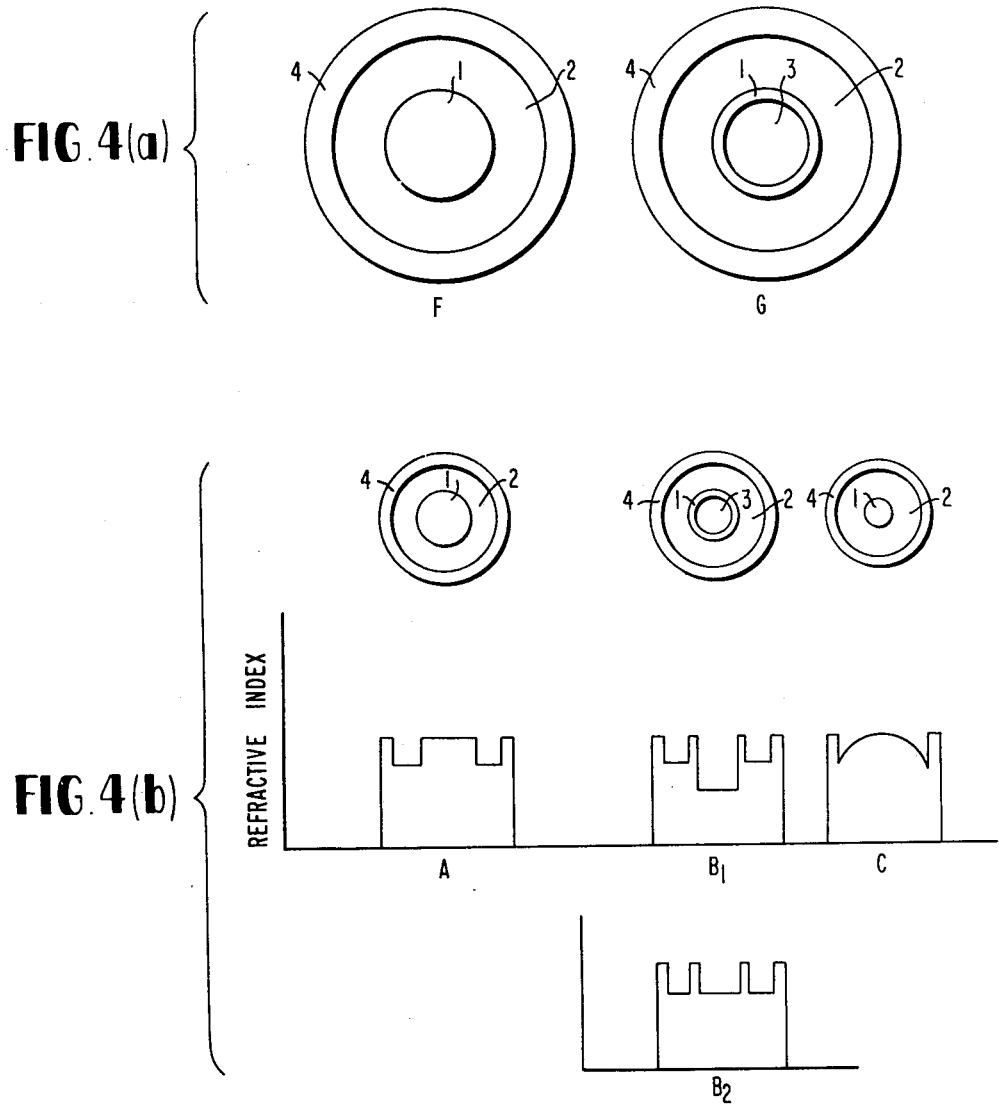

PROCESS FOR PRODUCING OPTICAL TRANSMISSION FIBER

RELATED APPLICATIONS

This application is a divisional application of Ser. No. 648,997, filed Jan. 14, 1976 and now U.S. Pat. No. 4,161,505 in turn a divisional application of Ser. No. 419,011, filed Nov. 26, 1973, now abandoned. Ser. No. 648,998, filed Jan. 14, 1976, now U.S. Pat. No. 4,082,420, is a continuation application of Ser. No. 419,011, and in turn Ser. No. 826,572, filed Aug. 22, 1977, and now U.S. Pat. No. 4,165,152, is a divisional application of Ser. No. 648,998.

BACKGROUND OF THE INVENTION

1. Field of the Invention

This invention relates to a process for producing an optical transmission fiber.

2. Description of the Prior Art

Many of the optical transmission fibers in the prior art are made of optical glass and show considerable light absorption losses since such transmission fibers are more liable to contain impurities as compared with those made of a fused silica and are restricted with respect to the purities of the raw materials and the melting process therefor. Another example of a known optical transmission fiber is a fused silica clad type fiber. This clad type fiber is produced by depositing a fused silica layer doped with metal oxides on the inner surface of a fused silica pipe to increase the index of refraction above that of a fused silica, sintering the same in an oxygen atmosphere, heating and melting for spinning to eliminate the cavity of the fused silica pipe. The fiber is thereafter annealed in an oxygen atmosphere to completely oxidize the metal component.

This heat-treatment weakens the strength of the fiber.

SUMMARY OF THE INVENTION

This invention provides an optical transmission fiber comprising at least one lower index of refraction portion comprising a doped fused silica containing $B_2O_3$ or fluorine and at least one higher index of refraction portion comprising fused silica.

This invention overcomes the foregoing defects in the prior art and, provides a process for producing an optical transmission fiber in which a fused silica layer containing $B_2O_3$ or F therein is deposited on the surface of a pure fused silica to decrease the index of refraction from that of the pure fused silica.

This invention also provides a process of depositing a further $SiO_2$ layer on the outer surface of the doped fused silica layer thereby obviating the defects caused by the lowering of the melting point in the $SiO_2$-$B_2O_3$ system below that of the fused silica and further lowering the index of refraction in the $SiO_2$-$B_2O_3$ portion due to the tensile stress exerted thereon after the formation of the fiber.

In addition this invention provides a process for producing an optical transmission fiber in which the heating is effected within temperatures which result in less evaporation of $B_2O_3$ and enough movement of gas bubbles which are formed at lower temperature that the bubbles can be eliminated under vacuum or by the application of supersonic waves to increase the content of $B_2O_3$ in the $SiO_2$-$B_2O_3$ system.

Further this invention provides a process for producing a fiber which is formed by depositing a $SiO_2$ layer or a water-repellent glass on the outer periphery of the doped fused silica layer containing $B_2O_3$ or F so as to inhibit water permeation which may cause destruction in the network structure of the glass.

BRIEF DESCRIPTION OF THE ACCOMPANYING DRAWINGS

This invention is to be described in detail referring to the accompanying drawings for the illustration of preferred embodiments of this invention wherein:

FIG. 4 shows cross sections of other embodiments of this invention comprising a further $SiO_2$ layer or a water-repellent glass layer deposited on the periphery of the fused silica rod or pipe shown in FIG. 1.

DETAILED DESCRIPTION OF THE INVENTION

Figure 1A:
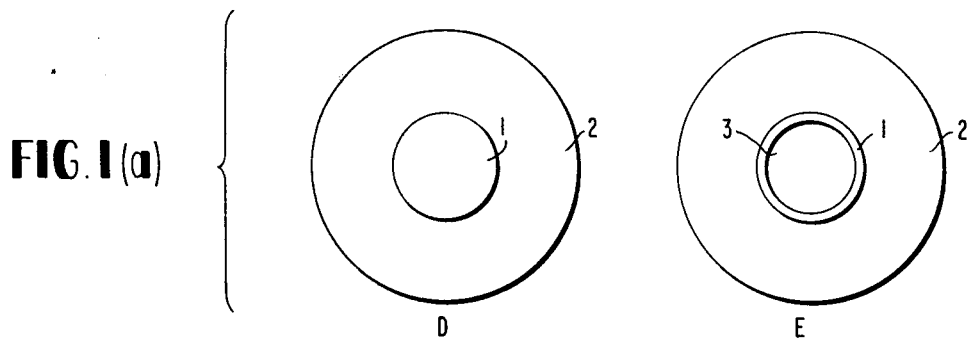
FIG. 1(a) shows cross sections of a fused silica rod and a pipe before spinning.
Figure 1B:
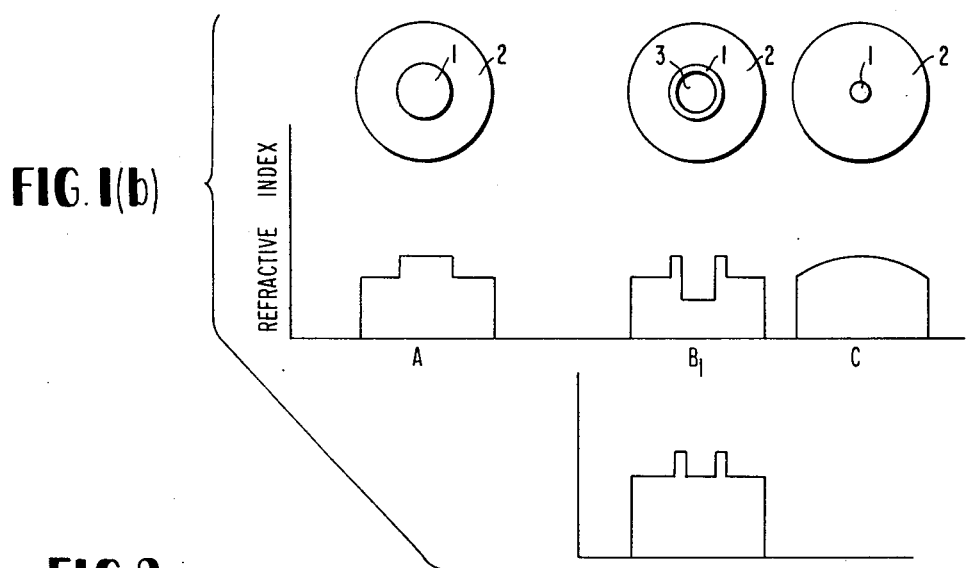
FIG. 1(b) shows cross sectional structures of preferred embodiments of this invention and the distribution of the index of refraction corresponding thereto in which A represents a clad type fiber, $B_1$ and $B_2$ are O-shaped optical wave guides and C is a fiber having a parabolic index of refraction distribution.

In FIGS. 1(a) and (b), FIG. 1(b) represents the cross sectional structures of fibers comprising preferred embodiments of this invention and the index of refraction distributions corresponding thereto and FIG. 1(a) shows the cross sections of a fused silica rod and a pipe before spinning.

In FIG. 1, are shown a clad type fiber A, optical O guides $B_1$ and $B_2$ and a fiber C having a parabolic index of refraction distribution. Highly pure fused silica 1 is surrounded with a layer 2 of a doped fused silica containing $B_2O_3$. 3 indicates a cavity portion (filled with air herein in the case of, $B_1$ or with a doped fused silica containing $B_2O_3$ in the case of $B_2$. Since the index of refraction in the portion 2 is lower than that of the portion 1, optical energy proceeds selectively concentrated in the portion 1. Distribution chart C indicates that the index of refraction decreases in the parts of the portion 2 nearer the surface since these surface parts contain more $B_2O_3$. This is also applicable to a fiber which contains F in the $SiO_2$ layer with only the difference being in the dopants.

Figure 2:
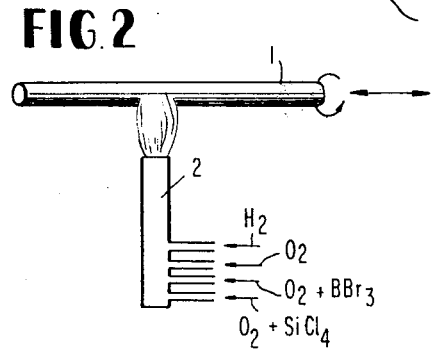
FIG. 2 is a schematic view for illustrating, as an example, the process for producing a fused silica rod or pipe to be spun into the fibers shown in FIG. 1(b)

FIG. 2 is a schematic view for the illustration of an example of the production of the fused silica rod or pipe which is spun into the fiber shown in FIG. 1(b). Generally, it is possible to oxidize hydrides, halides or organic compounds of boron and silicon into $SiO_2$ containing $B_2O_3$ together with respective $B_2O_3$ and $SiO_2$, and the $SiO_2$-$B_2O_3$ component can be deposited on the outer surface of the rod or pipe which is previously cleaned and smoothened by applying treatments such as mechanical polishing, laser finishing, sapphire polishing, fluoric acid washing or fire polishing. FIG. 2 shows a suitable apparatus for illustrating such a method in which a fused silica rod or pipe 1 is arranged so that it can be moved reciprocally in the longitudinal direction of the rod or pipe and can be rotated around the axis of the rod or pipe. BBr$_3$ and SiCl$_4$ carried in an oxygen stream are fed to an oxy-hydrogen burner 2 with the following reaction as shown below occurring at the exit:

$$SiCl_4 + 2H_2 + O_2 = SiO_2 + 4HCl$$

$$4BBr_3 + 6H_2 + 3O_2 = 2B_2O_3 + 12HBr$$

Simultaneously, the reaction products B$_2$O$_3$ and SiO$_2$ at a high temperature deposit in a powder or glass like state on the rod or pipe.

Figure 3:
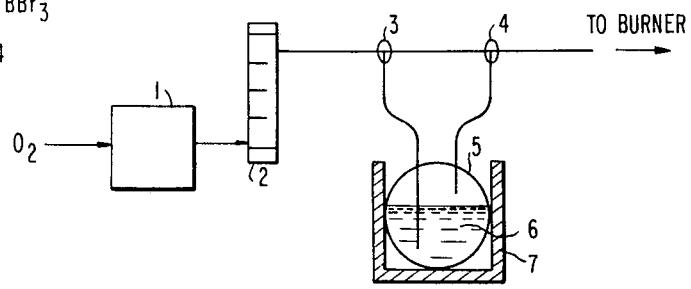
FIG. 3 shows a suitable apparatus for feeding $BBr_3$ and $SiCl_4$ by way of an oxygen carrier to a oxy-hydrogen burner shown in FIG. 2.

FIG. 3 shows a suitable apparatus for carrying the BBr$_3$ and SiCl$_4$ to the oxy-hydrogen burner shown in FIG. 2 in oxygen gas. In this figure, gaseous oxygen is purified in a purifier 1, passed through a flow meter 2 and bubbled, through liquid 6 of BBr$_3$ or SiCl$_4$ using three-way cocks 3 and 4 in an evaporator 5 provided in a thermo-statically controlled bath 7. BBr$_3$ or SiCl$_4$ vapor is thus carried in the oxygen gas and the gas mixture is fed to a burner.

Although the descriptions have been made for an oxygen carrier gas, it is of course possible to use other carrier gases such as inert gases, hydrogen, etc. as well.

The heat source is not necessarily limited to an oxyhydrogen flame but an electrical furnace, a high frequency plasma furnace or other furnaces can also be employed.

The melting and spinning of the rod D or pipe E thus produced (the inner cavity of which is either left as it is or is filled with a SiO$_2$-B$_2$O$_3$ component after cleaning the cavity) shown in FIG. 1(a) results in fibers A, B$_1$, B$_2$ and C shown in FIG. 1(b). The rod D is spun into fibers A and C, and the pipe E into fibers A and C when the cavity is eliminated and into the fiber B, i.e., B$_1$ when the cavity is left and B$_2$ when the cavity is filled.

A fiber shown in FIG. 1(a) and having a portion 3 consisting of SiO$_2$-B$_2$O$_3$ can be produced by depositing a SiO$_2$ layer on a cleaned surface of SiO$_2$-B$_2$O$_3$ and depositing a further layer of SiO$_2$-B$_2$O$_3$ thereon.

It is, of course, possible to form a fiber having a parabolic refractive index distribution by deleting the portion 1 in the rod or pipe shown in FIG. 1(a).

The method of depositing an SiO$_2$ glass layer containing F is to be described. Provisions are made for both of an axial reciprocating movement and a rotating movement of a rod or pipe 1 of a pure fused silica having a cleaned surface in just the same way as previously described with reference to FIG. 2. SiF$_4$ gas is fed around the outer surface of the rod or pipe and reacted in accordance with the following reaction scheme to form SiO$_2$ whereby F is incorporated into the SiO$_2$:

$$SiF_4 + 2H_2O + O_2 = SiO_2 + 4HF$$

Generally, SiO$_2$ can be obtained by oxidizing SiF$_4$, and a minor amount of F is incorporated then into this SiO$_2$. SiF$_4$ can be synthesized, for example, by the thermal decomposition of well-known highly pure compounds, BaSiF$_6$, K$_2$SiF$_6$, H$_2$SiF$_6$ or the like, or the reaction between SiO$_2$ and HSO$_3$F and the reaction between SiCl$_4$ and F$_2$.

Other compounds than SiF$_4$ can be employed such as halides, hydrides and organic compounds and they are oxidized with O$_2$ which contains F$_2$O. Alternatively, F$_2$ can be introduced in the oxidation stage, if desired. It is preferred to effect the oxidation by way of a reaction system in which hydrogen or H$_2$O is not present such as a high frequency plasma since HF is not thereby produced.

The rod F or pipe G shown in FIG. 4(a) is another embodiment of this invention in which an additional SiO$_2$ layer or water-repellent glass layer is deposited further on the outer surface of the rod D or pipe E shown in FIG. 1(a), wherein reference numbers 1, 2 and 3 represent the same components as those shown in FIG. 1(a).

The layer 4 can be deposited in just the same manner as layer 2 by oxidizing SiCl$_4$ to SiCO$_2$, or by applying glass frit having a smaller coefficient of expansion.

The rod F or pipe G in FIG. 4(a) can also be made using another method where a rod D or pipe E as shown in FIG. 1(a) is inserted in a water-repellent glass pipe or a fuse silica pipe 4 and then this pipe containing rod D or pipe E is heated to a high temperature and pulled at both ends to collapse the gaps between the rod D or pipe E and the pipe 4. The rod F and rod G or pipe G can also be made in different ways. For example, the rod F in FIG. 4(a) can be made using a method in which a doped fused silica containing B$_2$O$_3$ or F is deposited on the inner surface of a water-repellent glass pipe or a fused silica pipe 4, and a pure fused silica rod having a clean surface or a pure fused silica rod on to which doped a fused silica containing B$_2$O$_3$ or F has been deposited is inserted in the deposited pipe and then this pipe containing the rod is heated to a high temperature and pulled at both ends to collapse the gaps between the rod and pipe.

The pipe G in FIG. 4(a) can be made using a method where a doped fused silica containing B$_2$O$_3$ or F is deposited and then a pure fused silica is deposited on the inner surface of the water-repellent glass pipe or a fused silica pipe 4. The rod G in FIG. 4(a) can be made using a method where a doped fused silica containing B$_2$O$_3$ or F is deposited, a pure fused silica is deposited and the doped fused silica containing B$_2$O$_3$ or F is deposited alternatingly on the inner surface of the water-repellent glass pipe or fused silica pipe 4, and then this pipe or alternatively, this pipe into which a doped fused silica rod containing B$_2$O$_3$ or F has been inserted, is heated to a high temperature and pulled at both ends to collapse the gap between the pipe and the rod or cavity of the pipe.

The rod F and the pipe G in FIG. 4(a) are spun into fibers A and C shown in FIG. 4(b) when the cavity of pipe G is collapsed.

The pipe G in FIG. 4(a) is also spun into fiber B$_1$ shown in FIG. 4(b) when the cavity is not filled, while the rod G in FIG. 4(a) is spun into fiber B$_2$ in FIG. 4(b).

The invention will now be explained in greater detail by reference to the following non-limiting examples thereof. Unless otherwise indicated all parts, percents, etc. are by weight.

EXAMPLE

A process of this invention will be described by way of an experimental example. In the apparatus shown in FIG. 3, Ar gas, selected as a carrier gas, was fed at a flow rate of 2 l/min, carrying BBr$_3$ and SiCl$_4$ to the burner while the temperature of the evaporator 5 was kept at 30° C. 60 l/min of hydrogen gas and 45 l/min of oxygen gas were fed to the burner shown in FIG. 2. The outer surface of a pure fused silica rod of 10 mm in diameter was contacted with the burner flame and processed for 2 hours to form a rod of about 20 mm diameter. The rod was heated in a vacuum at 1300° C. for 2 hours and the rod was then spun by heating the rod in a high frequency furnace to obtain a fiber having a core diameter of 75μ and a deposition layer diameter of 150 microns. On passing laser light through this fiber, it was found that the light was completely trapped with less scattering losses, and the entire transmission losses were also low.

CHARACTERISTICS

The optical transmission fiber of this invention provides, as described above, a clad type fiber and an optical O guide of a highly pure fused silica portion in which the optical energy concentrates and a surrounding doped fused silica layer of a lower index of refraction containing $B_2O_3$ or F and thus it possesses high optical transmission characteristics and extremely low optical transmission losses.

Since completely oxidized $SiO_2$ or $B_2O_3$ is deposited on the clean surface of highly pure fused silica body in the doping with $B_2O_3$ as well as F, the interface is neither contaminated nor are gas bubbles formed (bubbles, if entrapped, can be eliminated by heating in vacuum or by application of supersonic waves under heating) thereby decreasing the scattering losses in the interface between the two fused silica media having a different index of refraction.

In addition, the index of refraction can easily be controlled by varying the amount of $B_2O_3$ contained in the fused silica. Moreover, the raw materials used in the process such as halides, hydrides or organic compounds of B and Si as well as $O_2$ gas can be obtained in a highly pure state due to their physical and chemical characteristics thus reducing the impurity content in the fused silica which contains the $B_2O_3$. This decreases the absorption losses and enables easily the preparation of a fiber with a parabolic index of refraction distribution in which the transmission losses are extremely low.

Since the inclusion of F does not substantially affect the light absorption, this process can provide a fiber having a transmission loss as low as that of the fused silica fiber, can provide an easy way to control the index of refraction and can provide a transmission fiber having less overall transmission losses.

In one preferred embodiment, the transmission fiber according to this invention has a further $SiO_2$ layer deposited on the outer surface thereof. In the $SiO_2$ layer containing $B_2O_3$, its melting temperature is lowered as the content of the $B_2O_3$ is increased for reducing the index of refraction, which decreases the viscosity of that portion resulting in a deformation in the shape thereof in the melting to spin. In order to avoid this deformation and spin a fiber satisfactorily, an additional $SiO_2$ layer is preferably deposited on this portion. A further effect is that the index of refraction of the $SiO_2$ layer is lowered due to the tensile stress exerted thereon, after the spinning, because the coefficient of expansion of the $SiO_2$-$B_2O_3$ system is higher than that of fused silica.

In the $SiO_2$ layer having F incorporated therein, the water-repellent glass layer is stable with respect to atmospheric conditions (primarily for humidity) at room temperature and inhibits water intrusion to the portion 2, which protects the doped fused silica doped with F portion from chemical attack by HF.

Further, the present process comprises a means to control the F content in the $SiO_2$ and to control uniformly the dispersion of the F therein. It can also prevent the incorporation of hydrogen in the production stage and its effects on the melting to spin and thus the protection of the fiber from destruction can be obtained.

The optical transmission fiber according to this invention provides great advantages for communication cables used in optical transmission, connecting feeders between equipment, light guides, etc.

While the invention has been described in detail and with reference to specific embodiments thereof, it will be apparent to one skilled in the art that various changes and modifications can be made therein without departing from the spirit and scope thereof.

What is claimed is:

1. A process for producing an optical transmission fiber comprising feeding highly pure halides, hydrides or organic compounds of Si and B using a carrier gas, and oxidizing said halides, hydrides or organic compounds to form doped fused silica containing $B_2O_3$ and depositing said doped fused silica containing $B_2O_3$ as a layer on a rod or pipe of pure fused silica and then depositing a fused silica or water-repellent glass layer on said doped fused silica layer containing $B_2O_3$ and melting and spinning said rod or pipe having said layers deposited thereon into a fiber.

2. The process for producing the optical transmission fiber of claim 1 wherein said process comprises after forming said doped layer, heating and melting said layer in a vacuum to eliminate gas bubbles.

3. The process for producing an optical transmission fiber of claim 1 wherein said process comprises after forming said doped layer, heating and melting said layer while applying supersonic waves to said layer to eliminate gas bubbles therefrom.

4. The process of producing an optical transmission fiber of claim 1, wherein said fiber exhibits a refractive index which varies between the periphery and the central longitudinal axis of said fiber, said variation being symmetrical with respect to the central longitudinal axis of the fiber.

5. A process for producing an optical transmission fiber, comprising feeding highly pure halides, hydrides or organic compounds of Si and B using a carrier gas, and oxidizing said halides, hydrides or organic compounds to form doped fused silica containing $B_2O_3$ and depositing said doped fused silica containing $B_2O_3$ as a layer on the outer surface of a rod or pipe of pure fused silica and inserting said rod or pipe into a second pipe of fused silica or water-repellent glass and melting and spinning said second pipe having said rod or said first pipe therein into a fiber.

6. The process for producing the optical transmission fiber of claim 5 wherein said process comprises after forming said doped layer, heating and melting said layer in a vacuum to eliminate gas bubbles.

7. The process of producing an optical transmission fiber of claim 5 wherein said process comprises after forming said doped layer, heating and melting said layer while applying supersonic waves to said layer to eliminate gas bubbles therefrom.

8. The process of producing an optical transmission fiber of claim 5, wherein said fiber exhibits a refractive index which varies between the periphery and the central longitudinal axis of said fiber, said variation being symmetrical with respect to the central longitudinal axis of the fiber.

9. A process for producing an optical transmission fiber comprising feeding highly pure halides, hydrides or organic compounds of Si and B using a carrier gas, and oxidizing said halides, hydrides or organic compounds to form doped fused silica containing $B_2O_3$ and depositing said doped fused silica containing $B_2O_3$ as a layer on the outer surface of a pure fused silica rod or pipe and placing said rod or pipe inside a doped fused silica second pipe containing $B_2O_3$, inserting said second pipe into a third pipe of fused silica or water-repellent glass and then melting and spinning said third pipe containing said second pipe and said first pipe or tube into a fiber.

10. The process for producing the optical transmission fiber of claim 9 wherein said process comprises after forming said doped layer, heating and melting said layer in a vacuum to eliminate gas bubbles.

11. The process of producing an optical transmission fiber or claim 9 wherein said process comprises after forming said doped layer, heating and melting said layer while applying supersonic waves to said layer to eliminate gas bubbles there from.

12. The process of producing an optical transmission fiber of claim 9, wherein said fiber exhibits a refractive index which varies between the periphery and the central longitudinal axis of said fiber, said variation being symmetrical with respect to the central longitudinal axis of the fiber.

13. A process for producing an optical transmission fiber comprising inserting a pure fused silica rod or a pure fused silica rod having thereon a doped fused silica layer containing $B_2O_3$ formed by feeding highly pure halides, hydrides or organic compounds of Si and B using a carrier gas and oxidizing said halides, hydrides or organic compounds to form doped fused silica containing $B_2O_3$ and depositing said doped fused silica containing $B_2O_3$ as a layer on the outer surface of a pure fused silica rod into a pipe of fused silica or water-repellent glass having on its inner surface a doped fused silica layer containing $B_2O_3$ formed in the same manner as said doped fused silica layer and melting and spinning said pipe containing said rod into a fiber.

14. The process for producing the optical transmission fiber of claim 13 wherein said process comprises after forming said doped layer, heating and melting said layer in a vacuum to eliminate gas bubbles.

15. The process of producing an optical transmission fiber of claim 13 wherein said process comprises after forming said doped layer, heating the melting said layer while applying supersonic waves to said layer to eliminate gas bubbles therefrom.

16. The process of producing an optical transmission fiber of claim 13, wherein said fiber exhibits a refractive index which varies between the periphery and the central longitudinal axis of said fiber, said variation being symmetrical with respect to the central longitudinal axis of the fiber.

17. A process for producing an optical transmission fiber comprising alternatingly depositing a doped fused silica layer containing $B_2O_3$ and a pure fused silica layer and further a doped fused silica layer containing $B_2O_3$ on to the inner surface of a pipe of fused silica or water-repellent glass and melting and spinning said pipe into a fiber, each of said doped fused silica layers being formed by feeding highly pure halides, hydrides or organic compounds of Si and B using a carrier gas, and oxidizing said halides, hydrides or organic compounds to form doped fused silica containing $B_2O_3$ and depositing said doped fused silica containing $B_2O_3$ as a layer.

18. The process for producing the optical transmission fiber of claim 17 wherein said process comprises after forming said doped layer, heating and melting said layer in a vacuum to eliminate gas bubbles.

19. The process of producing an optical transmission fiber of claim 17 wherein said process comprises after forming said doped layer, heating and melting said layer while applying supersonic waves to said layer to eliminate gas bubbles therefrom.

20. The process of producing an optical transmission fiber of claim 17, wherein said fiber exhibits a refractive index which varies between the periphery and the central longitudinal axis of said fiber, said variation being symmetrical with respect to the central longitudinal axis of the fiber.

21. A process for producing an optical transmission fiber comprising inserting a rod of doped fused silica containing $B_2O_3$ into a pipe of fused silica or water-repellent glass having deposited on its inner surface a dopd fused silica layer containing $B_2O_3$ formed by feeding highly pure halides, hydrides or organic compounds of Si and B using a carrier gas, and oxidizing said halides, hydrides or organic compounds to form doped fused silica containing $B_2O_3$ and depositing said doped fused silica containing $B_2O_3$ as a layer on the inner surface of said pipe and then deposit a pure fused silica layer on said doped fused silica containing $B_2O_3$ layer and melting and spinning said pipe containing said rod into a fiber.

22. The process for producing the optical transmission fiber of claim 21 wherein said process comprises after forming said doped layer, heating and melting said layer in a vacuum to eliminate gas bubbles.

23. The process of producing an optical transmission fiber of claim 21 wherein said process comprises after forming said doped layer, heating and melting said layer while applying supersonic waves to said layer to eliminate gas bubbles therefrom.

24. The process of producing an optical transmission fiber of claim 21, wherein said fiber exhibits a refractive index which varies between the periphery and the central longitudinal axis of said fiber, said variation being symmetrical with respect to the central longitudinal axis of the fiber.

25. A process for producing an optical transmission fiber comprising inserting a pure fused silica rod into a pipe of a doped fused silica containing $B_2O_3$, inserting said pipe into a second pipe of fused silica or water-repellent glass and melting and spinning said second pipe containing said first pipe containing said rod into a fiber.

26. The process of producing an optical transmission fiber of claim 25, wherein said fiber exhibits a refractive index which varies between the periphery and the central longitudinal axis of said fiber, said variation being symmetrical with respect to the central longitudinal axis of the fiber.

27. A process for producing an optical transmission fiber comprising inserting a rod of doped fused silica containing $B_2O_3$ inside a pure fused silica pipe, inserting said pipe containing said rod inside a second pipe of doped fused silica and inserting said second pipe containing said first pipe containing said rod into a third pipe of fused silica or water-repellent glass and then melting and spinning said third pipe containing said second pipe containing said first pipe containing said rod into a fiber.

28. The process of producing an optical transmission fiber of claim 27, wherein said fiber exhibits a refractive index which varies between the periphery and the central longitudinal axis of said fiber, said variation being symmetrical with respect to the central longitudinal axis of the fiber.

29. A process for producing an optical transmission fiber comprising depositing a doped fused silica layer containing $B_2O_3$ and then a fused silica layer onto the inner surface of a pipe of fused silica or water-repellent glass and melting and spinning said pipe into a fiber, said doped fused silica layers being formed by feeding highly pure halides, hydrides or organic compounds of Si and B using a carrier gas, and oxidizing said halides, hydrides or organic compounds to form doped fused silica containing $B_2O_3$ and depositing said doped fused silica containing $B_2O_3$ as a layer.

30. The process for producing an optical transmission fiber of claim 29, wherein said fiber exhibits a refractive index which varies between the periphery and the central longitudinal axis of said fiber, said variation being symmetrical with respect to the central longitudinal axis of the fiber.

31. The process for producing an optical transmission fiber of claim 29, wherein said process comprises after said depositing, heating and melting said layer deposited on said pipe in a vacuum to eliminate gas bubbles.

32. The process for producing an optical transmission fiber of claim 29, wherein said process comprises after the deposition, heating and melting said deposited layer on said pipe while applying supersonic waves to said layer to eliminate gas bubbles therefrom.

* * * * *

UNITED STATES PATENT AND TRADEMARK OFFICE
CERTIFICATE OF CORRECTION

PATENT NO. : 4,242,275
DATED : December 30, 1980
INVENTOR(S) : Arndt et al.

It is certified that error appears in the above-identified patent and that said Letters Patent are hereby corrected as shown below:

In the Heading, insert

--[30] Foreign Application Priority Data

May 13, 1976      Germany      2621168 --.

*Signed and Sealed this*

*Tenth Day of March 1981*

[SEAL]

*Attest:*

RENE D. TEGTMEYER

*Attesting Officer*      *Acting Commissioner of Patents and Trademarks*